Oct. 4, 1966

F. M. BALLOU 3,277,359

CIRCUIT BREAKER FOR RECTIFIER PROTECTION AND AN IMPROVED
CIRCUIT ARRANGEMENT OF RECTIFIERS AND CIRCUIT BREAKERS

Filed May 31, 1963

INVENTOR.
FRANK M. BALLOU
BY
Denny and Denny
HIS ATTORNEYS

Oct. 4, 1966 F. M. BALLOU 3,277,359
CIRCUIT BREAKER FOR RECTIFIER PROTECTION AND AN IMPROVED
CIRCUIT ARRANGEMENT OF RECTIFIERS AND CIRCUIT BREAKERS
Filed May 31, 1963 3 Sheets-Sheet 3

INVENTOR.
FRANK M. BALLOU
BY
*Denny and Denny*
HIS ATTORNEYS

United States Patent Office 3,277,359
Patented Oct. 4, 1966

3,277,359
CIRCUIT BREAKER FOR RECTIFIER PROTECTION AND AN IMPROVED CIRCUIT ARRANGEMENT OF RECTIFIERS AND CIRCUIT BREAKERS
Frank M. Ballou, Glen Rock, N.J., assignor to Heinemann Electric Company, Trenton, N.J., a corporation of New Jersey
Filed May 31, 1963, Ser. No. 284,431
10 Claims. (Cl. 321—11)

This invention relates to an improved arrangement of circuit breakers and rectifiers, particularly rectifiers comprising solid state elements, whereby upon certain abnormalities in certain of the rectifier elements, the associated circuit breaker contacts will open, isolating the defective rectifier element from the other parts of the circuit including the other rectifier elements so that the latter are not damaged due to the initial abnormality in one rectifier element.

The most common type of abnormality or failure in a rectifier using solid state elements is the short circuiting of one of the elements in one of the legs of the circuit comprising the rectifier. It is an object of this invention to electrically isolate the short circuited rectifier element in one of the legs of the rectifier before the elements in the other legs of the rectifier are damaged due to the initially short circuited element.

This is, certain solid state elements, such as silicon diode rectifier elements, have very low thermal capacity and are destroyed within a fraction of a second upon being subjected to excessively heavy overloads. Consequently the devices used to protect these solid state elements should be operative within this very short time period to accomplish reliable overload protection for such rectifiers. At the present time quick blowing fuses are commonly used for overload protection of rectifiers using such solid state elements with the concomitant disadvantage, where parallel rectifier elements are used, that complete shutdown of the equipment is needed to replace the blown fuses and to replace the rectifier elements which have failed. Thus, another object of this invention is to provide improved mechanical circuit breakers for use with rectifiers, in a novel circuit arrangement, whereby the opening of the circuit breaker contacts indicates an abnormality in the rectifiers and simultaneously electrically isolates the faulted rectifier element of the rectifiers before any consequent damage can ensue to other rectifier elements of the rectifiers.

In this invention twice the quantity of rectifier elements which would normally be required are used, connected in series pairs, each pair replacing a similar single rectifier element of substantially the same rating, i.e., forward current carrying capacity and inverse peak voltage rating. Upon the failure of one rectifier element of the series pair, the other rectifier element will continue to function normally and block the flow of reverse current, thereby preventing damage to the other rectifier elements in the other legs of the rectifier during the interval between occurrence of the failure and the opening of the circuit breaker contacts.

The mechanical circuit breaker is used in conjunction with each series pair of rectifier elements to detect a failure in one or the other element of the pair and to automatically and electrically isolate that series pair of rectifier elements from the rest of the circuit. The contacts of the circuit breaker are connected electrically in series with the series pair of rectifier elements and a voltage sensing coil or winding is connected in parallel with each rectifier element of the series pair. Application of rated circuit voltage to either coil will cause the circuit breaker to trip instantaneously. Tripping of the circuit breaker under normal conditions of operation is prevented by connecting the two coils magnetically substractively, i.e., so that the magnetic flux produced by one coil is of equal magnitude and opposite direction to the flux produced by the other coil.

In one embodiment of my invention a circuit breaker is provided with relatively movable contacts separable by a linkage mechanism controlled by an electromagnet for protecting two rectifier elements. The electromagnet includes two coils wound in opposite directions and in electrical series with each other. One of the rectifier elements to be protected is placed in shunting relation with one of the coils and the other rectifier in the same relation with the other coil. Further, the electromagnet includes an armature operable by the magnetic flux produced by only one of the two coils when rated inverse voltage is applied to that coil (and not the other coil) for tripping the linkage mechanism controlling the contacts.

Normally the magnetic fluxes created by the two coils are of equal and opposite polarity and thus the fluxes cancel one another. However, if one of the rectifier elements becomes subject to a short circuit, for instance, since the rectifier elements allow the flow of current therethrough in substantially one direction only, upon a reverse electrical cycle, the coil associated with the short circuited rectifier element will be shunted, but not the other coil, and consequently the armature will be actuated due to the magnetic flux created by this one coil only. Also, upon the failure of one of the rectifier elements, for instance, due to its becoming open circuited, the associated winding is no longer shunted thereby, while the other winding remains shunted. At such time the first mentioned winding becomes fully energized and the magnetic flux created by it alone is sufficient to attract the armature, to trip the linkage and open the contacts of the circuit breaker.

The foregoing and other objects of the invention, and the best modes in which I have contemplated applying such principles will more fully appear from the following description and accompanying drawings in illustration thereof.

Figure 1:
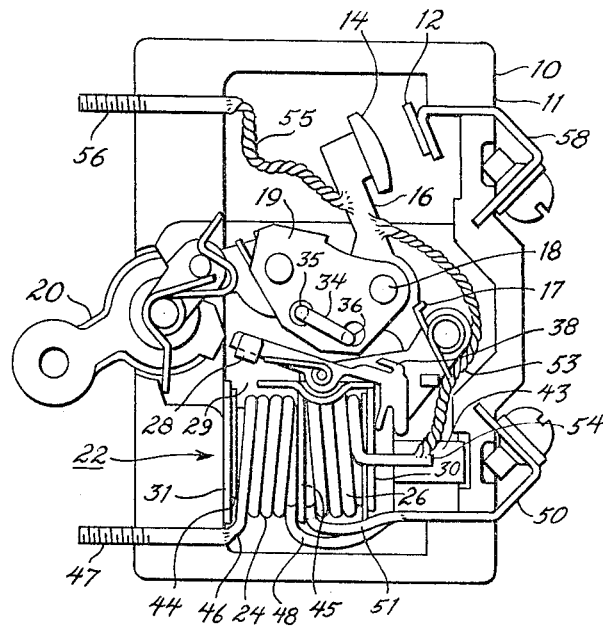
FIG. 1 is a side view of a circuit breaker mechanism embodying the invention, the circuit breaker being shown mostly in side elevation, the circuit breaker mechanism being in the open or disengaged position of the contacts, and the two coils of the electromagnet being wound in opposite directions.

This invention is embodied in a circuit breaker unit 10 comprising an outer insulating casing 11 enclosing a stationary contact 12 and a movable contact 14.

The action of the movable contact 14 on predetermined overload is set forth in Patent No. 2,360,922, and the circuit breaker linkage mechanism therefore does not form part of this invention but for clarity's sake may be briefly described as follows: The movable contact 14 is carried on the end of a movable arm 16 which is biased by a spring 17 toward the open position of the contacts. The movable arm 16 is connected by a pintle 18 to a latching toggle mechanism 19 which is in turn connected to a handle 20. When the handle 20 is rotated clockwise, as viewed in FIG. 1, the latching mechanism 19 and the movable arm 16 all move to the right and bring the contact 14 into engagement with the contact 12 against the bias of the spring 17, the contacts 12 and 14 thus assuming the closed position, not illustrated.

The circuit breaker is further provided with an electromagnet 22 including oppositely wound solenoid coils 24 and 26 and an armature member 28 magnetically attracted toward the gap 29 located between the L-shaped magnetizable member 30 and the vertical magnetizable pole piece 31, the latter two forming a magnetizable frame. The latching mechanism 19 includes a toggle, one member of which carries a U-shaped latching pintle 34 which is biased by a spring (not shown) into latching engagement for latching the mechanism 19. The latching pintle 34 has two legs extending perpendicular to the plane of FIG. 1, a leg 35 for latching the mechanism 19, and a leg 36 for tripping the mechanism. When the contacts 12 and 14 are engaged, the leg 36 is located immediately above the unlatching member 38, the latter being integral with and carried by the armature 28. Thus, sufficient movement of the armature 28 toward the gap 29 due to abnormal conditions rotates the oppositely extending unlatching member 38 and moves it upwardly to engage the leg 36 and thereby turn the latching leg 35 to the unlatched position, whereby the latching mechanism 19 is free to collapse under pressure of the opening spring 17.

The two solenoid coils 24 and 26 are disposed in side-by-side relation and are each formed by an equal number of insulated turns of wire, but one coil is wound in a direction opposite to that of the other coil, about a part of the spool 43 and they are mounted upon an insulator bobbin 44 and further electrically separated from each other by an annular insulator barrier or washer 45.

The coil 24 has an end portion 46 connected to a terminal structure 47 and a conductor is connectable from the latter to an alternating current source. The other end 48 of the coil 24 is connected to another terminal structure 50, as illustrated in FIG. 1, the end conductor 51 of coil 26 being also brazed to the terminal structure 50.

The other end 54 of the coil 26 is connected by a flexible pigtail 53 to the movable arm 16 and the latter is connected by another flexible conductor 55 to the terminal 56. The electrical circuit of the circuit breaker is then completed by connecting the stationary contact 12 to the terminal 58, as illusrated in FIG. 1, the terminal 58 being connectable by an external line conductor to a direct current load.

Figure 2:
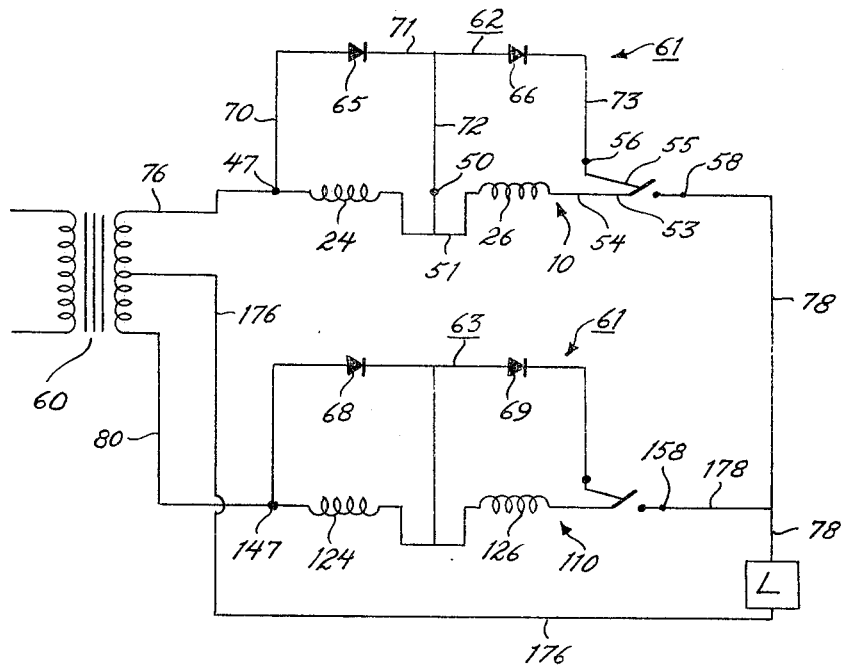
FIG. 2 is a diagrammatic view of a circuit breaker and a pair of rectifier elements to be protected for single phase, full wave rectification.

In FIG. 2, the novel circuit arrangement of this invention is illustrated for full wave rectification of single phase current supplied by the secondary winding of supply transformer 60 to a rectifier 61 for a direct current load L. The rectifier 61 has two legs 62 and 63, the leg 62 comprising a series pair of rectifier elements 65 and 66. Likewise, circuit leg 63 comprises a series pair of rectifier elements 68 and 69. (Were it not for the present invention, only one rectifier element 65 or 66 would be used in the leg 62 as each is capable of providing the direct current requirements of the load L. Similarly, only one of the rectifier elements 68 or 69 would be used in leg 63 but for this invention.)

Associated with the series pair of rectifier elements 65 and 66 is the circuit breaker 10 constructed in accordance with FIG. 1 and as described in connection therewith. A similar circuit breaker 110 is associated with the series pair of rectifier elements 68 and 69 and the similar parts thereof are distinguished hereinafter by a prefix "1." In FIG. 2, only certain parts of the circuit breakers 10 and 110 are diagrammatically illustrated.

Referring to FIG. 2, the coil 24 is placed in shunting relation with the rectifier element by a conductor 70 extending between terminal 47 and one end of the rectifier element 65. The other end of the rectifier element 65 is connected to one end of the rectifier element 66 by a conductor 71 and the two adjacent ends of the rectifier elements 65 and 66 are connected to the terminal 50 by another conductor 72. The other end of the rectifier element 66 is connected by a still further conductor 73 to the terminal 56. The rectifier leg 62 and the circuit breaker 10 are then connected, at one end, by a conductor 76 to one side of the secondary winding of the transformer 60 from the terminal 47 and, at the other end, the rectifier leg 62 and the circuit breaker 10 are connected by a conductor 78 to one side of the direct current load L from the terminal 58.

The connections for the rectifier leg 63 and the circuit breaker 110 are similar to those previously described for rectifier leg 62 and circuit breaker 10, and, hence, are not described in detail but it should be noted that conductor 176 extends from the middle of the secondary winding of the transformer 60 to the other end of the load L and a conductor 178 is connected between terminal 158 and the conductor 78. From the other side of the transformer secondary winding a conductor 80 extends to the terminal 147 of the circuit breaker 110, all as illustrated in FIG. 2.

Each of the coils 24, 26, 124 and 126 is constructed so that one will produce a sufficient magnetic flux to actuate the circuit breaker armature instantaneously when one of the coils is energized at rated output voltage of the transformer 60 and the other is substantially not energized.

With the foregoing arrangement, in normal operation, since the rectifier elements 65, 66, 68 and 69 provide a very low resistance to the flow of electrical current through them when the polarity is for this flow, the coils 24, 26, 124 and 126, respectively, are shunted. Of course, in the embodiment of FIG. 2, current will flow through only two rectifier elements, for instance, elements 65 and 66 (and their associated coils 24 and 26) during one half of the alternating current cycle, at which time substantially no current flows through the other two rectifier elements 68 and 69 (and the coils 124 and 126), and the electromagnetic fluxes produced by the two coils through which the current is flowing cancelling each other because of the reverse winding. Of course, when the polarity reverses at the supply transformer 60, the foregoing relationship reverses, rectifier elements 68 and 69 now conducting and rectifier elements 65 and 66 not conducting.

Upon the occurrence of an initial short circuiting of one of the rectifier elements 65 or 66 or one of the rectifier elements 68 or 69, the armature of the associated circuit breaker 10 or 110 is instantly actuated by the electromagnetic flux produced by only one of the coils for opening the circuit breaker contacts and electrically isolating the rectifier leg 62 or 63 from the circuit before a similar fault can occur in the other rectifier element of the same pair of rectifier elements in which the initial fault has occurred to prevent a further failure in the other rectifier leg of the circuit. Thus, this invention provides an arrangement for indicating when a rectifier element has become short circuited.

Similarly, if one of the rectifier elements 65 or 66 or one of the rectifier elements 68 or 69 is open circuited, the associated circuit breaker contacts will open removing the rectifier leg in which the open circuited rectifier is disposed from the circuit. When a rectifier element is open circuited, even though no damage usually results to the other rectifier elements, continued operation with an open circuited rectifier element would be undesirable as the rectifier would be incapable of providing full rated current to the load, so that the fact that the present invention provides an arrangement for indicating this type of fault also is of further value.

In each of the foregoing instances, indication of the fault is obtained by movement of the circuit breaker handle to the contacts open position.

Although extremely rare, it could also happen that both of the rectifier elements of one rectifier leg could have simultaneous faults, but that this is an extremely rare happening is seen from the fact that it has been estimated that such joint failure must occur within a time period of eight thousandths of a second with 60 cycles per second alternating current. If both rectifier elements of one rectifier leg fail simultaneously, the circuit breaker contacts would not open. If this simultaneous failure is due to both elements in one leg being open circuited, no damage would result to the other rectifier and even though alternating current might be imposed on the direct current load the happening of this is so extremely remote as to be of no practical concern. If this simultaneous failure is due to both elements in one leg being short circuited, fast acting fuses in series with the secondary winding of the transformer may be used where it is desired to guard against even this remote possibility. If this simultaneous failure is due to one rectifier element of a pair becoming shorted and the other rectifier element becoming open circuited, the coil associated with the shorted element would not be energized whereas the coil associated with the open circuited element would be fully energized, so that the electromagnetic flux produced by the latter coil would actuate the armature of the circuit breaker to trip the mechanism and open the contacts.

The circuit breakers utilized are of the type which open instantaneously upon the energization of only one of their coils at predetermined voltage conditions. Thus, in one embodiment, circuit breakers utilized are adjusted so that they must trip instantaneously when between 101% and 120% of rated voltage or a higher voltage than this range is applied to one coil.

As to the specific rating of the coils, in one example, coils (for a circuit in accordance with FIG. 2) having a wire cross section so as to be rated to sustain 50% of operating voltage, i.e., one-half of the transformer 60 secondary winding output voltage, that is, having a wire cross-section such that they can sustain 50% of this operating voltage continuously without premature burning out of the coil, may be used. Since the two coils associated with one rectifier leg are in series, the operating voltage will be sustained by the two coils substantially equally and each coil will be functioning at approximately its rated voltage of 50%. When only one coil is energized due to a failure of the rectifier associated with the other coil, the energized coil will be energized with a voltage equivalent to 200% of its rated (50%) coil voltage, and since the circuit breakers are preadjusted to open between 101 and 120% of operating voltage or a higher voltage, the circuit breaker will open the circuit instantaneously. It should be noted that because 200% of rated coil voltage is impressed on the coil for a period of short duration before the contacts open, the coil is not damaged.

While the use of coils rated at 50% of operating voltage has been given as a specific example, it is not intended that this invention is limited to coils that are rated only at 50% of operating voltage, since the concept of the invention is equally applicable with coils rated at more or less than 50% of operating voltage. The range of coil ratings which may be used depends on practical considerations of size, coil life desired, and cost.

As a practical matter, a coil with a rating as high as 80% of operating voltage may be used. With such a coil, tripping will take place at least at 125% of coil rating when 100% of operating voltage is applied to one coil. If each opposing coil is wound for 80% of operating voltage, then the two coils in series will be suitable for carrying 160% of operating voltage without undue overheating. However, since only 100% of operating voltage is available under normal circumstances, the coils in normal operation will only be carrying 62½% of their rated load, resulting in less heat rise in the coil and consequently a longer life. If one of these coils is now called upon to trip by reason of a failure of one rectifier element, the theoretical voltage available for tripping is 100% (neglecting the voltage drop thru the other circuitry). This means that the coil rated at 80% voltage will now have 100% voltage applied or 125% of the coil rating which is above the 120% of coil rating for which value the circuit breaker has been adjusted that it must trip.

A coil with a rating of as low as 40% of operating voltage, as a practical matter, may be used. Since the two coils are in series, it is seen that their series voltage rating is 80% of operating voltage. When operating with 100% of operating voltage across the two coils it is seen that this results in the two coils jointly carrying 125% of their voltage rating. Each coil, however, is carrying 62½% of the operating voltage rating at this time, well below the 120% operating voltage value for which the circuit breaker has been adjusted that it must trip. Since each coil, however, is only rated for 40% of operating voltage, but is carrying 62½%, the coil will tend to overheat and have a reduced life, unless the cross-section of the wire is increased to accommodate the greater voltage and, hence, the greater current.

If desired, the circuit breakers may be interconnected so that upon the tripping of one, the other circuit breaker will also trip, if it is desired to isolate not only the rectifier leg in which one element has failed but the entire rectifier.

Figure 3:
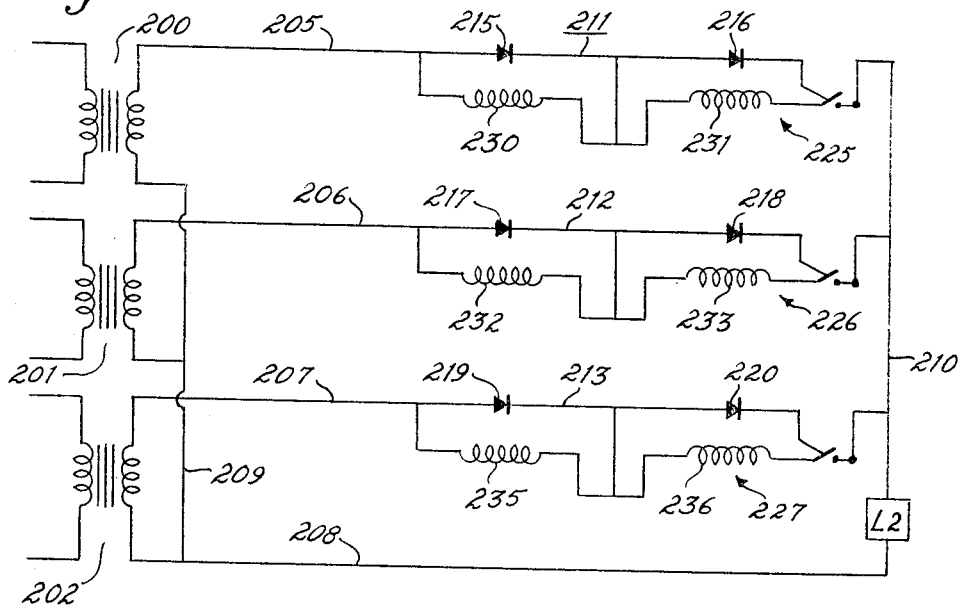
FIG. 3 is a diagrammatic view illustrating an arrangement for three phase half wave rectification.
Figure 4:
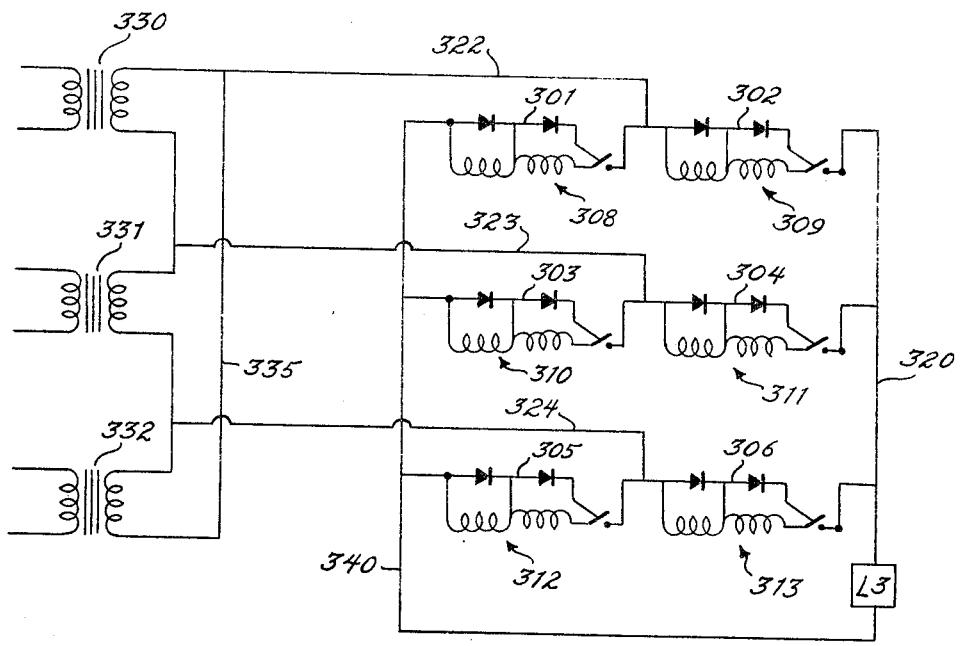
FIG. 4 is a diagrammatic view illustrating an arrangement for three phase full wave rectification.

FIGS. 3 and 4 illustrate the concept of this invention applied to three phase electrical circuits. In FIG. 3, the secondary windings of supply transformers 200, 201 and 202 are connected by conductors 205, 206, 207, 208, 209 and 210 to supply half wave rectified current to a load L2. Interposed in each of the conductors 205, 206 and 207 are rectifier legs 211, 212 and 213 each comprising two series rectifier elements, preferably silicon diodes, 215 and 216 in rectifier leg 211, in rectifier leg 212 the rectifier elements 217 and 218 and in rectifier element 213 the rectifier elements 219 and 220.

Associated with each rectifier leg is a circuit breaker, constructed similar to that illustrated in FIG. 1. That is, associated with rectifier elements 215 and 216 is circuit breaker 225, with elements 217 and 218 is the circuit breaker 226 and with elements 219 and 220 is the circuit breaker 227.

Each of the circuit breakers 225, 226 and 227 is provided with two coils, wound in opposite directions, and designated as 230 and 231 in circuit breaker 225, 232 and 233 in circuit breaker 226 and as 235 and 236 in circuit breaker 227. Each of the circuit breakers 225, 226 and 227 comprise movable contacts which are opened when the associated armature is moved to the tripping position by the electromagnetic flux produced by one coil only.

While the circuit arrangement is adapted to a three phase half wave rectification system in FIG. 3, upon the short or open circuiting of any one rectifier element, the associated circuit breaker is actuated, as described in connection with FIG. 2, to electrically isolate one rectifier leg from the system before damage to the other rectifier legs may result.

In FIG. 4 a circuit arrangement for three phase, full wave rectification is illustrated. This arrangement comprises six rectifier legs 301, 302, 303, 304, 305 and 306; each leg comprises two rectifier elements, preferably silicon diodes, connected to each other in electrical series. Associated with the rectifier legs 301 to 306 are circuit breakers 308 to 313, as illustrated. The rectifier legs 302, 304 and 306 and the circuit breakers 309, 311 and 313 are connected at one end to the load L3 by conductor 320. Conductors 322, 323 and 324 connect the other ends of the rectifier legs 302, 304 and 306 and, thereby, also the other ends of the circuit breakers 309, 311, and 313 to the secondary windings of supply transformers 330, 331 and 332. The adjacent ends of the secondary windings of the transformers 330 and 331 are connected together, as illustrated, as are the adjacent ends of the transformers 331 and 332, and the opposite ends of the secondary windings of transformers 330 and 332 are connected by a conductor 335. The circuit is completed by electrically connecting the left hand ends of the rectifier legs 301, 303 and 305 and their associated circuit breakers 308, 310 and 312 to the load L3 by a conductor 340.

Each circuit breaker illustrated in FIG. 4 is constructed similar to that illustrated in connection with FIG. 1 and associated with a series pair of rectifiers in the same manner as described previously whereby upon a short or open circuit in any one of the rectifier elements, the associated circuit breaker contacts will open to electrically isolate from the rest of the circuit the rectifier leg in which the short or open circuit element exists.

Figure 5:
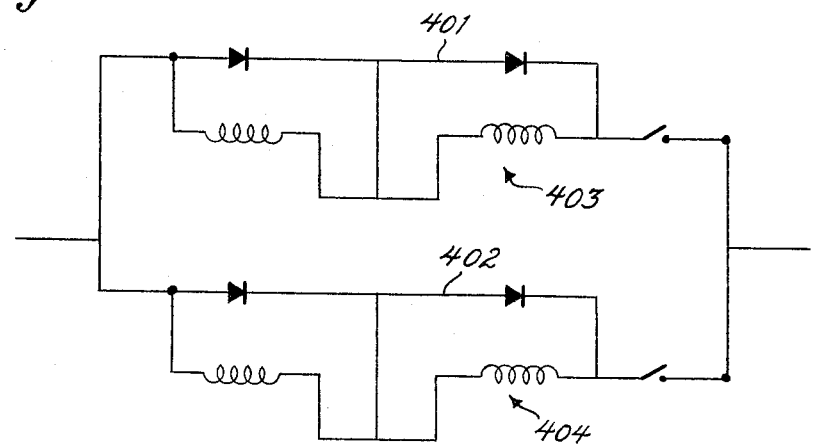
FIG. 5 is a diagrammatic view of a modified leg of a high capacity rectifier applicable to any one of the embodiments illustrated in FIGS. 2 through 4, inclusive.

FIG. 5 illustrates the invention applied to a high capacity rectifier. In such rectifier, each rectifier leg may comprise two or more parallel branches. In FIG. 5, a rectifier leg is illustrated comprising rectifier branches 401 and 402 in parallel with each other. The rectifier branch 401 has associated with it a circuit breaker 403 constructed and arranged in accordance with FIG. 1 but not herein described or illustrated in further detail and the rectifier branch 402 has similarly associated with it the circuit breaker 404.

In all of the foregoing embodiments, the two coils which are associated with one armature have been illustrated and described as formed by turns of wire wound in opposite directions. However, these coils could also be formed by turns of wire wound in the same direction if the coil ends are connected electrically so that the polarity of the fluxes resulting upon energization of the coils (when the loads are functioning normally) are subtractive, i.e., the flux produced by one coil substantially cancels the flux produced by the other coil. Thus, while not illustrated, in FIG. 2, if the wire turns of the coils 24 and 26 were wound in the same direction, and if the coil end 54 were connected to the terminal 50 (instead of being connected to the flexible conductor 53) and the coil end 51 were connected to the flexible conductor 53 (instead of being connected to the terminal 50) the flux produced by the coil 26 would then be of opposite polarity to that produced by the coil 24, and during normal load conditions the armature would not be actuated, but upon abnormal conditions the result would be as heretofore described in connection with the description of the coils wound in opposite directions.

From the foregoing it is seen that a circuit breaker has been provided with plural coils and an armature associated with a plural load, the armature being actuatable to trip the circuit breaker mechanism and open the circuit breaker contacts, due to the electromagnetic flux of one coil, upon predetermined conditions in the load, but said coils normally producing subtractive fluxes so that during normal load conditions said armature is not actuated.

Having described this invention, I claim:

1. The combination of a circuit breaker and rectifier elements comprising a circuit breaker having a housing, relatively movable contacts within said housing, a linkage mechanism within said housing for separating said contacts upon predetermined fault conditions of said rectifier elements, said mechanism being actuated by an electromagnet comprising two coils formed by insulated turns of wire wound in opposite directions and connected in electrical series with each other, said electromagnet including an armature for tripping said mechanism, each of said coils providing sufficient magnetic flux to individually attract the armature sufficiently to trip the mechanism upon predetermined conditions, a first rectifier element connected in parallel with one of said coils, and a second rectifier element connected in parallel with the other coil, said rectifiers being connected for the flow of current therethrough in the same direction, and said rectifiers being connected in series with each other, a source of alternating current, and a direct current load.

2. In combination, a circuit breaker comprising a housing, relatively movable contacts within said housing, a trip mechanism within said housing for separating said contacts upon predetermined conditions, said trip mechanism being actuated by an electromagnet comprising two coils formed by insulated turns of wire wound in opposite directions and connected in electrical series with each other, said electromagnet including an armature for tripping said mechanism, each of said coils providing sufficient magnetic flux to individually attract the armature sufficiently to trip the mechanism upon the predetermined current, and two rectifier elements connected to said coils for energizing neither of said coils during flow of current in one direction and for energizing only one of the coils when one rectifier element is short or open circuited.

3. In combination, circuit breakers each comprising a pair of relatively movable contacts and a linkage mechanism for controlling said contacts, each of said circuit breakers including an electromagnet for actuating the mechanism, each electromagnet having an even number of coils formed by insulated turns of wire half of which are wound in opposite directions to the other half, said coils being connected in series with each other, a network of an even number of current rectifier elements to provide current rectification connected to a direct current load and to an alternating current source, said coils shunting said rectifier elements, the electromagnetic fluxes of the coils in each circuit breaker, when all coils are not shunted, cancelling each other, but removal of one rectifier element from shunting relation with the associated coil energizing the last mentioned coil, whereby the electromagnet actuates the associated mechanism to open the contacts and thereby electrically remove certain rectifying elements from said network.

4. In a circuit breaker, the combination comprising a housing, relatively movable contacts within said housing, a mechanism for controlling said contacts, an electromagnet for controlling said mechanism, said electromagnet comprising an armature, said electromagnet further comprising two coils of the same number of turns, connected in electrical series with each other, and electromagnetically associated with said armature, and said coils being wound in opposite directions to produce electromagnetic fluxes substantially cancelling one another.

5. The circuit breaker recited in claim 4 in combination with electrical loads shunting one of said coils and not the other upon predetermined conditions.

6. In combination, a circuit breaker comprising a housing, relatively movable contacts within said housing, a linkage mechanism for controlling said contacts, an electromagnet for controlling said linkage mechanism, said electromagnet comprising an armature and two coils for actuating said armature, said coils producing fluxes of equal but opposite polarity, and circuit means external to said circuit breaker controlling the energization of said coils to actuate said armature upon predetermined electrical conditions in said circuit means.

7. The combination of a circuit breaker and rectifier elements comprising a circuit breaker having a housing, relatively movable contacts within said housing, a linkage mechanism within said housing for separating said contacts upon predetermined fault conditions of said rectifier elements, said mechanism being actuated by an electromagnet comprising two coils formed by insulated turns of wire connected electrically so as to produce fluxes of substantially equal but opposite polarities, said electromagnet including an armature for tripping said mechanism, each of said coils providing sufficient magnetic flux to individually attract the armature sufficiently to trip the mechanism upon predetermined conditions, a first rectifier element connected in parallel with one of said coils, and a second rectifier element connected in parallel with the other coil, and said rectifiers being connected in series with each other, a source of alternating current, and a direct current load.

8. In combination, a circuit breaker comprising a housing, relatively movable contacts within said housing, a trip mechanism within said housing for separating said contacts upon predetermined conditions, said trip mechanism being actuated by an electromagnet comprising two coils formed by insulated turns of wire connected electrically so as to produce substantially subtractive fluxes, said electromagnet including an armature for tripping said mechanism, each of said coils providing sufficient magnetic flux to individually attract the armature sufficiently to trip the mechanism upon the predetermined current, and two rectifier elements connected to said coils for energizing neither of said coils during flow of current in one direction and for energizing only one of the coils when one rectifier element is short or open circuited.

9. In combination, circuit breakers each comprising a pair of relatively movable contacts and a linkage mechanism for controlling said contacts, each of said circuit breakers including an electromagnet for actuating the mechanism, each electromagnet having an even number of coils formed by insulated turns of wire all wound in the same direction but connected electrically to produce subtractive fluxes, said coils being connected in series with each other, a network of an even number of current rectifier elements to provide current rectification connected to a direct current load and to an alternating current source, said coils shunting said rectifier elements, the electromagnetic fluxes of the coils in each circuit breaker, when all coils are not shunted, cancelling each other, but removal of one rectifier element from shunting relation with the associated coil energizing the last mentioned coil, whereby the electromagnet actuates the associated mechanism to open the contacts and thereby electrically remove certain rectifying elements from said network.

10. In a circuit breaker, the combination comprising a housing, relatively movable contacts within said housing, a mechanism for controlling said contacts, an electromagnet for controlling said mechanism, said electromagnet comprising an armature, said electromagnet further comprising two coils of substantially the same number of turns wound in the same direction, connected in electrical series with each other, and electromagnetically associated with said armature, and said coils being connected electrically to produce subtractive fluxes normally substantially cancelling one another.

References Cited by the Examiner
UNITED STATES PATENTS
3,099,828  7/1963  Kelly _____ 321—14

JOHN F. COUCH, *Primary Examiner.*

W. H. BEHA, *Assistant Examiner.*